(12) United States Patent
Filiputti et al.

(10) Patent No.: US 10,072,580 B2
(45) Date of Patent: Sep. 11, 2018

(54) METHOD AND SYSTEM FOR THE EMERGENCY START-UP OF AN ENERGY GENERATOR SET

(71) Applicant: SAFRAN HELICOPTER ENGINES, Bordes (FR)

(72) Inventors: Hugues Filiputti, Monestier de Clermont (FR); Franck Garde, Signes (FR); Romain Thiriet, Jurancon (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 396 days.

(21) Appl. No.: 14/396,235

(22) PCT Filed: Apr. 18, 2013

(86) PCT No.: PCT/FR2013/050863
§ 371 (c)(1),
(2) Date: Oct. 22, 2014

(87) PCT Pub. No.: WO2013/160590
PCT Pub. Date: Oct. 31, 2013

(65) Prior Publication Data
US 2015/0128592 A1    May 14, 2015

(30) Foreign Application Priority Data
Apr. 27, 2012  (FR) ...................... 12 53938

(51) Int. Cl.
*F02C 7/272* (2006.01)
*F02C 7/26* (2006.01)
*F02C 7/275* (2006.01)

(52) U.S. Cl.
CPC ............... *F02C 7/272* (2013.01); *F02C 7/26* (2013.01); *F02C 7/275* (2013.01); *Y02T 50/671* (2013.01)

(58) Field of Classification Search
CPC .. F02C 7/275; F02C 7/262; F02C 7/27; F02C 7/268; F02C 7/26; F02C 7/32; F02C 7/36;
(Continued)

(56) References Cited

U.S. PATENT DOCUMENTS

| 2,942,415 | A | * | 6/1960 | Bayard | .................... | F02C 7/272 |
| | | | | | | 123/179.31 |
| 3,633,360 | A | * | 1/1972 | Kelley | .................... | F02C 7/272 |
| | | | | | | 123/179.31 |

FOREIGN PATENT DOCUMENTS

| FR | 1 104 252 A | 11/1955 |
| FR | 1 126 010 A | 11/1956 |

(Continued)

OTHER PUBLICATIONS

Wikipedia, the free encyclopedia, "Hydraulic Pump", Mar. 22, 2011.*
(Continued)

*Primary Examiner* — Carlos A Rivera
*Assistant Examiner* — Thuyhang Nguyen
(74) *Attorney, Agent, or Firm* — Oblon, McClelland, Maier & Neustadt, L.L.P.

(57) ABSTRACT

An emergency starter that allows responsiveness within a few seconds, without having disadvantages associated with mass and size of a back-up hydraulic or pneumatic starter. An instantaneous gas thrust of pyrotechnic type is coupled with a positive displacement transmission generator in conjunction with automatic coupling to/uncoupling from a set that is to be started. An emergency start-up system includes at least one pyrotechnic gas generator connected to an electrical initiator itself connected to a computer, a positive displacement motor housing straight-cut gears, the pyrotechnic gas generator being coupled to the motor by an inlet in the casing. The motor includes a mechanism of connection
(Continued)

capable of moving at one end of the drive shaft configured to couple the transmission shaft to a driven shaft of the set that is to be started via a centrifugal clutch.

12 Claims, 5 Drawing Sheets

(58) Field of Classification Search
CPC .............. F02C 7/272; F05B 2270/1072; F05B 2270/107; F05B 2270/092; F05D 2260/85
See application file for complete search history.

(56) References Cited

FOREIGN PATENT DOCUMENTS

| FR | 1 303 228 A | 9/1962 |
|----|-------------|--------|
| FR | 1 334 270 A | 8/1963 |

OTHER PUBLICATIONS

International Search Report dated Sep. 16, 2013 in PCT/FR2013/050863 filed Apr. 18, 2013.

* cited by examiner

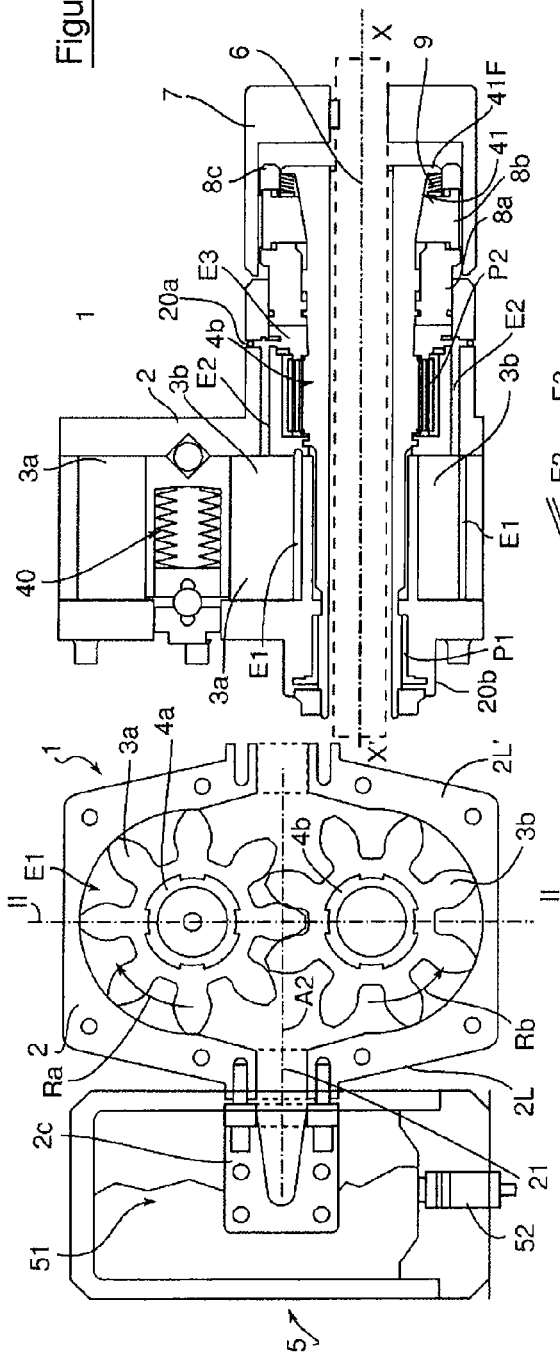
Figure 2a
Figure 1
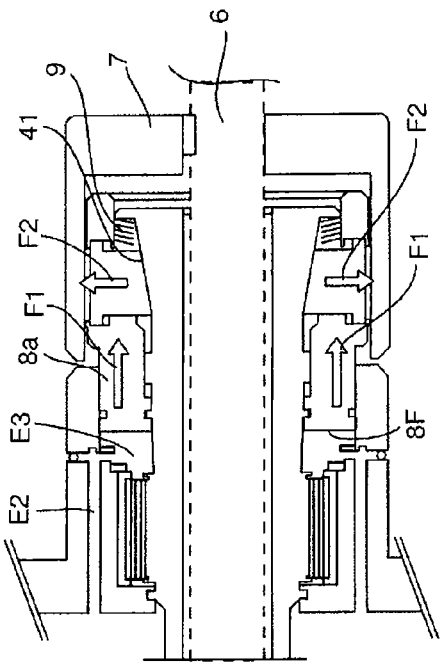
Figure 2b

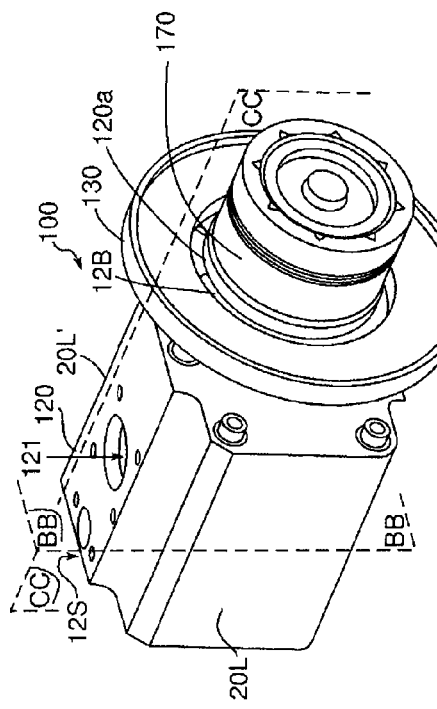
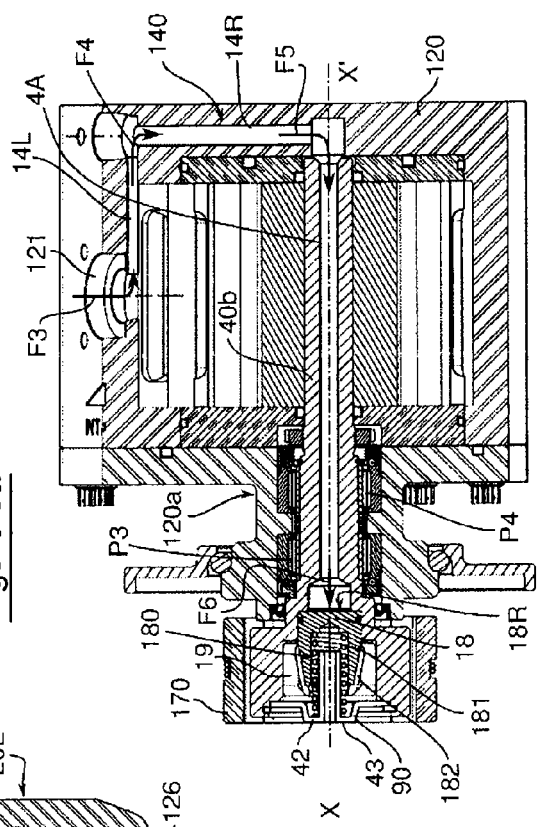
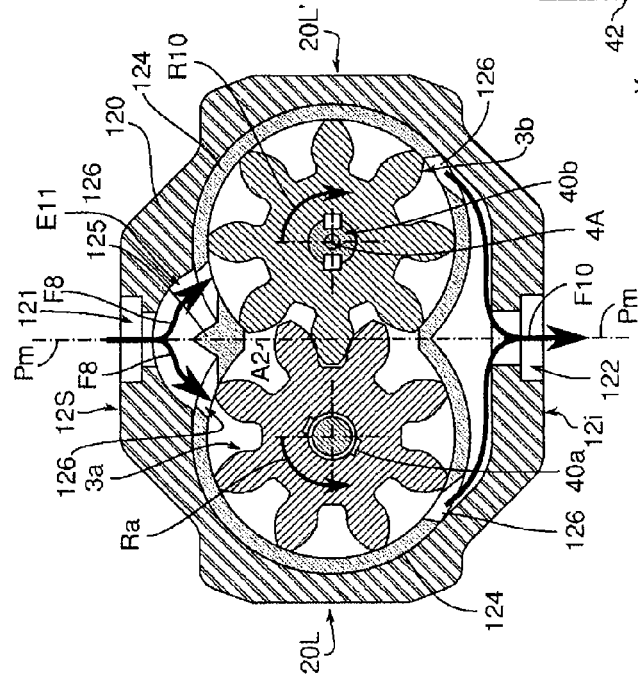
Figure 3a
Figure 3b
Figure 3c

METHOD AND SYSTEM FOR THE EMERGENCY START-UP OF AN ENERGY GENERATOR SET

TECHNICAL FIELD

The invention relates to a method and to a system for the emergency start-up of an energy generator set in critical situations where the dedicated traction system has stopped or is inadequate to meet requirements.

The invention can be applied in the context of assistance or ultimate back-up to initiate the activation or reactivation of energy generation in various fields of technology:
- aeronautic traction systems for aeroplane or helicopter gas turbines;
- electrical engineering for ultra-limiting circuit breakers for the production and transmission of electrical power, particularly in submarines;
- in drilling or for marine immersion for master valve screws, robots etc; the field known as "Oil & Gas";
- in extreme environments (hospitals, nuclear power stations, airports, server centres) for generators, pumps, safety valves etc.;
- in heat generation of a Stirling or Ericsson-type generator set;
- in hydraulic or pneumatic generation for handling heavy items (landing gear actuators, hoists etc.).

In the case of a twin-engine helicopter in particular, critical situations can arise when one of the engines is switched off intentionally. This mode is indeed recommended, for minimising consumption in the cruising and search phases of a mission. In this case, two exceptional situations can arise, which then require emergency restarting of the engine that is switched off:
- the single operating engine stops or slows down substantially for an unknown reason;
- flight conditions deteriorate unexpectedly, requiring a return to twin-engine mode (insufficient height, for example).

PRIOR ART

A gas turbine can currently be restarted using three types of starter with different physical features;
- electric starters with a power supply from the on-board power supply or from a battery;
- pneumatic starters having a torque converter device (planetary gear train or stepped gearbox) and a pressurised gas reservoir; and
- hydraulic starters comprising a pressurised fluid generator coupled to a pressurised fluid reservoir.

Pneumatic and hydraulic starters have drawbacks connected to their mass and size. Moreover, they require periodic inspections of their casings and replacement of the pressurised reservoirs.

What is more, for application in an emergency situation for a helicopter as mentioned above, a turboshaft engine is restarted while in flight by an electric starter supplied from the on-board power supply or by a reserve battery. However, this technology is expensive: it requires permanent magnets, transverse flux, planar structure etc. It also requires an electronic charge-monitoring device and periodic battery changes.

Moreover, and fundamentally, it seems that these electric starters do not provide torque instantaneously. Consequently, the reaction sequence typically takes about thirty seconds when restarting the standby engine, which could prove too long for some flight conditions, for example at low altitude with at least partial failure of the only operating engine. If the standby engine does not restart in time, landing with the problematic engine could prove critical.

More generally, the emergency situations that might arise in the applications mentioned above require reaction times of approximately a few seconds, particularly two to three seconds, or even less than a second, to allow a sufficient safety margin for emergency starting or restarting.

DESCRIPTION OF THE INVENTION

The invention seeks to provide emergency starters that allow responsiveness of this order of magnitude, namely within a few seconds, without having the disadvantages associated with the mass and size of the back-up hydraulic or pneumatic starters mentioned above.

To achieve this, the present invention proposes coupling an instantaneous gas thrust of pyrotechnic type with a positive displacement transmission generator in conjunction with automatic coupling to/uncoupling from the set that is to be started.

More specifically, the object of the present invention is a method for emergency start-up of an energy generator set wherein, if an emergency start-up situation for the set is detected, at least one pyrotechnic gas combustion generator is triggered. Pressurised gases are then generated by this combustion and injected directly into a positive displacement motor with gear wheels, preferably straight-cut. A portion of these gases then rotates the gear wheels of the engine and, simultaneously, the remaining portion of the gases projects a coupling connection between the engine and the set, against a restoring force. The connection brings about the transmission of energy by rotating a gear shaft of the positive displacement motor on a driven shaft of the set. When the thrust falls below the restoring force, said force automatically repels the connection and the set is disconnected from the positive displacement motor.

According to particular embodiments:
- the coupling connection between the gear shaft and the driven shaft of the set to be restarted is produced by friction;
- the remaining gases are injected into the positive displacement motor peripherally about the longitudinal axis so that the coupling connection uses radial compression to rotate the shaft of the set to be restarted;
- the remaining gases are injected into the positive displacement motor centrally along the longitudinal axis so that the coupling connection uses conical coupling to rotate a shaft of the set to be restarted, by axial and radial compression;
- successive instances of pyrotechnic gas combustion generation are triggered;
- the restoring force is generated by means chosen from elastic force, electromagnetic force and expansion of a compressed fluid.

The invention also relates to a system for the emergency start-up of an energy generator set capable of implementing the above method. This system comprises at least one pyrotechnic gas generator connected to an electrical initiator, itself connected to a computer, a positive displacement motor comprising a casing defining an internal space housing straight-cut gear wheels, the pyrotechnic gas generator being coupled to the motor by an inlet in the casing. The motor has a connection means capable of moving at one end of the drive shaft centred about a gear-wheel axis of the positive displacement motor, so as to be able to couple this drive shaft to a driven shaft of the set via a centrifugal clutch. And a return means arranged in abutment is capable of exerting a restoring force against the pressure exerted on the connection means.

Typically, the dimensions of each positive displacement motor are such that it can provide power of approximately 40 kW for around 2.5 seconds for each injection of pyrotechnic gas, with a reaction time of approximately 0.5 seconds. Moreover, the system has suitable sizes and ratings to allow use nominally in the temperature range between −30 and +50° C., a range that can be extended to the rated limiting temperatures of the surrounding equipment, for example of approximately 135° C. for the extreme environments mentioned above. The ambient operating pressure is between around 60 and 110 kPa.

According to preferred embodiments:
- an annular space, formed in an extension of the casing peripherally about the drive shaft of the positive displacement motor, communicates with said internal space to allow part of the gases coming from the combustion of the pyrotechnic gas to be injected as far as the connection means; this connection means being composed of an annular piston, capable of being moved in translation by the thrust of the gases along the drive shaft of the motor, so as to exert pressure on a ferrule capable of moving aside radially under this pressure and driving the centrifugal clutch by friction;
- the second connection component is composed of at least one portion of an open annular ferrule, which is moved aside radially by sliding along a conical portion of the drive shaft of the motor;
- a conduit connected to the gas inlet of the casing communicates with a central bore of the drive shaft to allow some of the gases coming from the pyrotechnic gas generator to circulate as far as the connection means; this connection means being composed of a conical piston, capable of being moved in translation by the thrust of the gases along the axis of the drive shaft of the motor, so as to become housed in a tapered bore, rigidly connected to the centrifugal clutch, in order to drive it by friction;
- the electrical initiator is constituted by an electronic unit having an autonomous electrical power source, and an electronic control board incorporating a heat-sensitive component and a microcontroller for managing the electrical power source, the heat-sensitive component, functional self-tests and alarms for triggering an ignition cartridge of the pyrotechnic gas generator;
- the gear wheels of the positive displacement motor are spur pinions;
- the positive displacement motor is in two stages, a first stage is coupled downstream to a second stage mounted in tandem, the first motor being a spur-pinion motor or a vane motor, the gas outlet of the first motor being connected to the gas inlet of the second motor, which can have substantially greater dimensions than the first motor, the central or drive shaft of the first motor being mounted on the secondary shaft of the second motor;
- if the set is a turbine engine having a high-pressure (HP) spool shaft, the driven shaft is chosen from an accessory gearbox shaft mounted on the HP spool, a bell housing rigidly connected to a pinion of the accessory gearbox and used as a centrifugal clutch, and the shaft of the HP spool;
- if the set is an ultra-limiting circuit breaker, the driven shaft is the shaft of the poles released when a short-circuit occurs;
- in the "Oil & Gas" field or in extreme environments, the driven shaft is a mechanically controlled tool shaft (valve, rack system, robot, grid of dampers);
- in the case of a set such as an Ericsson or Stirling cycle heat engine or equivalent, having a heat exchanger assembly and a variable angle setting circuit, the driven shaft is the control shaft of the heat exchanger assembly and the electronic unit incorporates an additional adapted setting angle function during the isochoric phases of the heating and condensation cycle of the heat engine cycle.

BRIEF DESCRIPTION OF THE FIGURES

Other aspects, characteristics and advantages of the invention will become apparent from the following description, relating to particular embodiments, with reference to the accompanying drawings, in which, respectively:

FIG. 1 is a diagrammatic view in cross section of a first example of a positive displacement motor of the emergency start-up system according to the invention;

FIGS. 2a and 2b are diagrammatic views in longitudinal section of the positive displacement motor according to FIG. 1, before and after the projection of pyrotechnic gas;

FIGS. 3a to 3c are views in perspective, in cross section along BB and in longitudinal section along CC, of another example of a positive displacement motor of the emergency start-up system according to the invention;

FIG. 8b is the mounting of this positive displacement motor on a bell housing rigidly connected to a pinion of the accessory gearbox according to FIG. 8a;

FIG. 8c shows the mounting of this positive displacement motor directly on the shaft of the HP spool of the turbine engine according to FIG. 8a.

DETAILED DESCRIPTION

Figure 5:
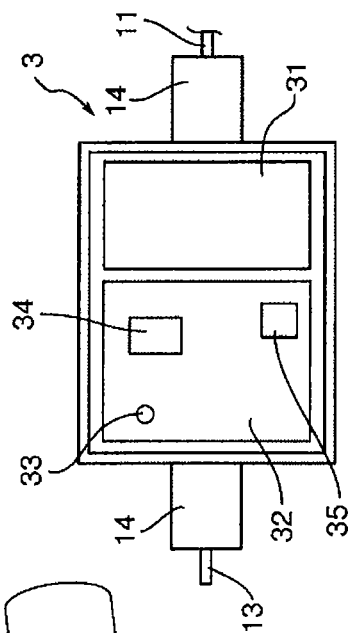
FIG. 5 is a sectional view of the electronic unit according to FIG. 4.

In the description, the term "cross section" relates to a view in the plane perpendicular to what is described as the longitudinal axis of the motors, which extend mainly along such an axis. The term "longitudinal section" denotes a sectional view along said longitudinal axis. The terms "upper" or "lower" refer to relative positions of the wall or face of a device placed in a standard operating position. Furthermore, identical reference signs relate to identical components as described in the corresponding passages.

With reference to the cross-sectional view in FIG. 1, a first example of a positive displacement motor 1 of an emergency start-up system according to the invention has a casing 2 defining an internal space E1 housing two spur pinions 3a and 3b, capable of rotating in opposite directions of rotation (arrows Ra and Rb) about drive shafts 4a and 4b. The casing 2 has two opposite side walls 2L and 2L' substantially symmetrical relative to the longitudinal plane II-II. A gas inlet 21 and a gas outlet 22, formed respectively on the walls 2L and 2L', have the same axis A2, which extends substantially perpendicular to the walls 2L and 2L', halfway between the gear wheels 3a and 3b.

A linking conduit 2C is fixed in the gas inlet 21 and in the core of a pyrotechnic gas generator 5, to allow the propulsion of combustion gases into the motor 1. This gas generator 5 contains a propellant block 51 connected to an ignition cartridge 52.

As can be seen from the view in FIG. 2a, in longitudinal section along the plane II-II, the casing 2 of the motor 1 and the shaft 4b of the pinion 3b extend longitudinally along the drive shaft 4b with the gear-wheel axis X'X, so as to accommodate a shaft 6 of an energy generator set to be restarted. The driven shaft 6 passes through the drive shaft 4b and is rigidly connected outside the shaft 4b, to a cylindrical centrifugal clutch 7.

The centrifugal clutch 7 covers movable annular parts—a piston 8a, a ferrule 8b and a support 8c—for rotatably connecting the drive shaft 4b and the clutch 7. The drive shaft 4b is mounted on bearings P1 and P2 in the cylindrical extensions 20a and 20b of the casing 2, and the shaft 4a of the pinion 3a is mounted in the casing 2 by a mechanism 40 with balls and spring plates.

At the end of the drive shaft 4b is a conical portion 41 supporting the ferrule 8b, which has a complementary tapered shape. A spring 9, arranged in a space capped by the clutch 7, between the stop 8c and the ferrule 8b, bears at one end on the ferrule 8b and, at the other end, on an end plate 41F, formed at the end of the conical portion 41.

Moreover, an annular space E2, formed in the extension 20a of the casing 2, on the periphery of the drive shaft 4b, communicates at one end with the internal space E1 of the motor 1 and, at the other end, with a radial space E3 closed off by the side face 8F of the piston 8a.

As illustrated in FIG. 2b, when gases coming from the combustion of the propellant are propelled into the internal space E1 (FIG. 1) of the motor 1, a portion of these gases is injected into the annular space E2 as far as the radial space E3. Under the thrust of the gases against its side face 8F, the piston 8a is imparted a movement in translation (arrows F1) along the axis X'X along the shaft 4b, and exerts corresponding pressure on the ferrule 8b. The ferrule 8b, constituted by two half-ferrules held between the piston 8a and the support 8c, moves aside radially (arrows F2) by means of the half-ferrules sliding along the conical portion 41, and then comes into close contact with the centrifugal clutch 7. The clutch is rotated by friction and, simultaneously, rotates the driven shaft 6 of the set to be started.

As soon as the pressure of the gases goes below a given threshold, the return spring 9 exerts sufficient force to push the ferrule 8b in the opposite direction to the arrow F1 and contact between this ferrule and the clutch 7 is broken: the driven shaft 6 is instantly disengaged.

Another example of a positive displacement motor of the emergency start-up system according to the invention is illustrated in the perspective and sectional views in FIGS. 3a to 3c.

With reference to FIG. 3a, the positive displacement motor 100 resembles the preceding positive displacement motor externally, with a casing 120 having two side walls 20L and 20L' and a centrifugal clutch 170 mounted on the cylindrical extension 120a of the casing around a drive shaft (see FIG. 3c). An end plate 130 is mounted on this cylindrical extension 120a via a ring 12B, to allow the motor to be fixed to a casing of the set to be restarted. A gas inlet 121 can be seen on the "upper" wall 12S of the casing 120.

In the cross section in FIG. 3b (section BB in FIG. 3a), the casing 120 defines an internal space E11 housing—inside jackets 124—the two spur pinions 3a and 3b of the preceding example, capable of turning in opposite directions of rotation (arrows Ra and Rb) about drive shafts 40a and 40b. The incoming gases (arrows F8) are separated by a deflector 125 and the jackets have openings 126 through which the gases can circulate within the internal space E11. The drive shaft 40b has a central bore 4A, which is capable of channelling a portion of the combustion gases. The two opposite side walls 20L and 20L' of the casing 120 are substantially symmetrical. The gas inlet 121 and the gas outlet 122, formed respectively on the "upper" and "lower" walls 12S and 12l, have the same axis of symmetry A2, which extends in a median plane Pm, parallel to the walls 20L and 20L'. The gases are discharged (arrow F10) via the openings 126.

With reference to FIG. 3c (in longitudinal section along CC in FIG. 3a), it can be seen that the rotating connection means between the drive shaft 40b—mounted on the bearings P3 and P4—and the centrifugal clutch 170 is constituted by a conical piston 18 and a corresponding conical housing 18L, formed within an annular part 19 rigidly connected to the centrifugal clutch 170. A helical spring 90 is arranged in a bore 180 of the piston 18, along a rod 42 coming from a stop 43 rigidly connected to the end of the drive shaft 40b. The spring 90 extends between the stop 43 and a shoulder 181 formed at the bottom of the bore 180 of the piston 18. Furthermore, a conduit 140, having a longitudinal portion 14L and a radial portion 14R, connects the gas inlet 121 of the casing 120 to the central bore 4A of the drive shaft 40b.

When combustion gases are released by combustion of the propellant gas, the greater part of the gases rotate the pinions 3a and 3b of the motor 100 and the shafts 4a and 4b. In turn, the drive shaft 4b drives the piston 18. The lesser part of the gases is channelled via the conduit 140 (arrows F3, F4 and F5), towards the central bore 4A of the shaft 40b. The gases are then propelled against the radial face 18R of the piston 18 (arrow F6) which moves in translation along the axis X'X of the drive shaft 40b. The piston 18 comes into close contact within its conical housing 18L, and then rotates by friction the annular part 19, together with the centrifugal clutch 170, which is rigidly connected to the part 19.

As in the preceding example, as soon as the pressure of the gases goes below said given threshold, the return spring 90 exerts sufficient force to push the piston 18 in the opposite direction to the arrow F6 and contact between the piston and the part 19 rigidly connected to the clutch 170 is broken: a driven shaft of the set to be started, in connection with the clutch 170, is then disengaged.

Figure 4:
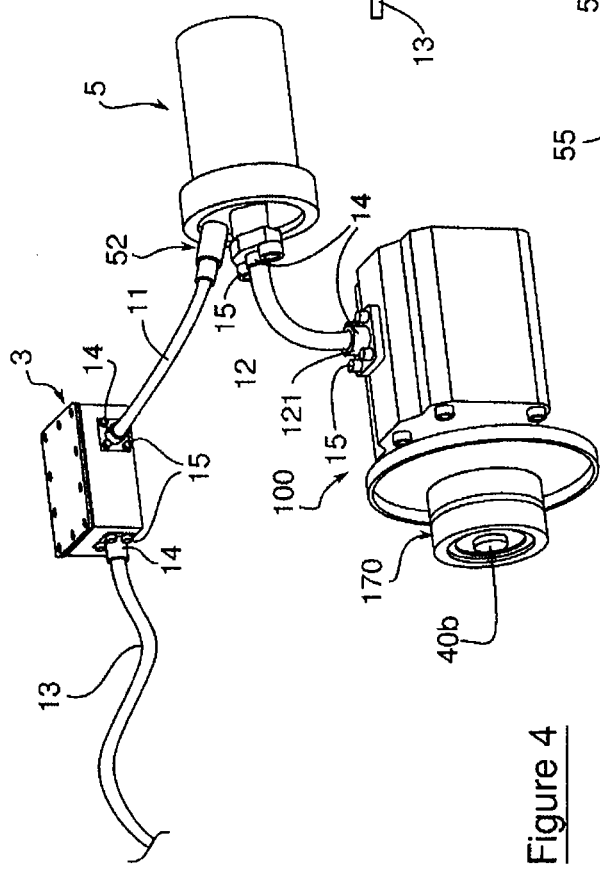
FIG. 4 is an overall view an example of the emergency start-up system according to the invention, composed of an electronic unit, a pyrotechnic generator and a positive displacement motor.

The overall view of an example of the emergency start-up system 10 according to the invention is illustrated in FIG. 4. This system comprises an electronic unit 3, a pyrotechnic generator 5 and the positive displacement motor 100. More precisely, the electronic unit 3 is connected via an electrical conduit 11 to the ignition cartridge 52 of the pyrotechnic generator 5, itself connected to the inlet 121 of the motor 100 via a rigid metal conduit 12. Moreover, the electronic unit 3 is connected to the computer (not shown) of the set to be started, a turbine engine in the example, via an electrical conduit 13. Connectors 14 fixed by screws 15 provide the connection between the conduits 11 to 13 and the electronic unit 3, the pyrotechnic generator 5 and the positive displacement motor 100. This motor 100 has a centrifugal clutch 170 linked to the drive shaft 40b so as to drive a shaft of the set that is to be started.

As shown more precisely by the sectional view in FIG. 5, the electronic unit 3 houses a battery 31 as an autonomous source of electrical power, and an electronic control board 32. This board incorporates a heat-sensitive component 33 and a microcontroller 34 for managing the battery 31, the heat-sensitive component 33, functional self-tests and alarms triggering the ignition cartridge 52 for the pyrotechnic generator 5. The conductors 11 and 13 are mounted on the unit 3 by means of the connectors 14.

The triggering alarms include alarms for detecting potential fires, triggered by the heat-sensitive component 33, and the alarms controlled by the computer on the basis of data supplied by speed sensors or temperature probes.

Advantageously, the electronic board 32 incorporates a temperature measurement component 35 managed by the microcontroller 34, to monitor high temperature values and allow the computer to determine service life without damaging operational safety.

Figure 6:
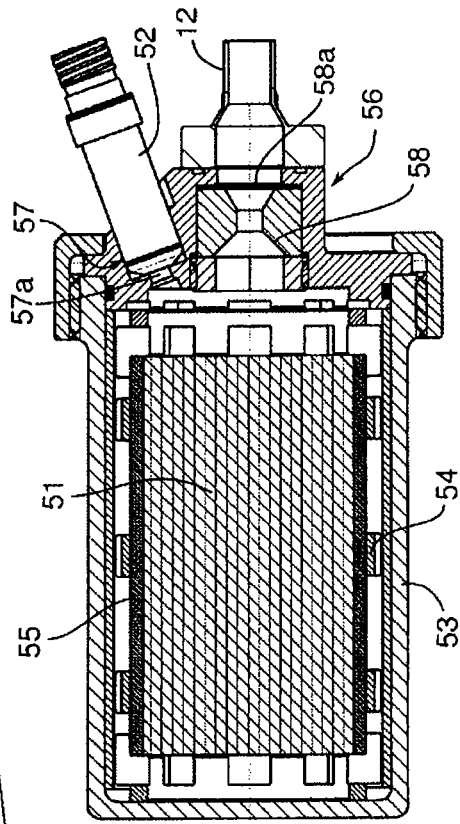
FIG. 6 is a sectional view of the pyrotechnic generator according to FIG. 4.

A sectional view of the pyrotechnic generator 5 is also illustrated in FIG. 6. This generator is composed of a metal body 53 within which the propellant block 51 is arranged on spacers 54. A layer of inhibitor 55 surrounds the block 51 at its sides. A metal cap 56 is fixed firmly to the body 53 to ensure a hermetic seal. The ignition cartridge 52 is screwed into a channel 57 formed in the cap 56 and closed by a tip 57a capable of melting above a predetermined temperature. The combustion gases of the propellant ignited by the cartridge 52 exit via a seal 58a of a tuned nozzle 58 linked to the metal conduit 12 that leads to the positive displacement motor 100 (see FIG. 4).

Figures 7A, 7B:
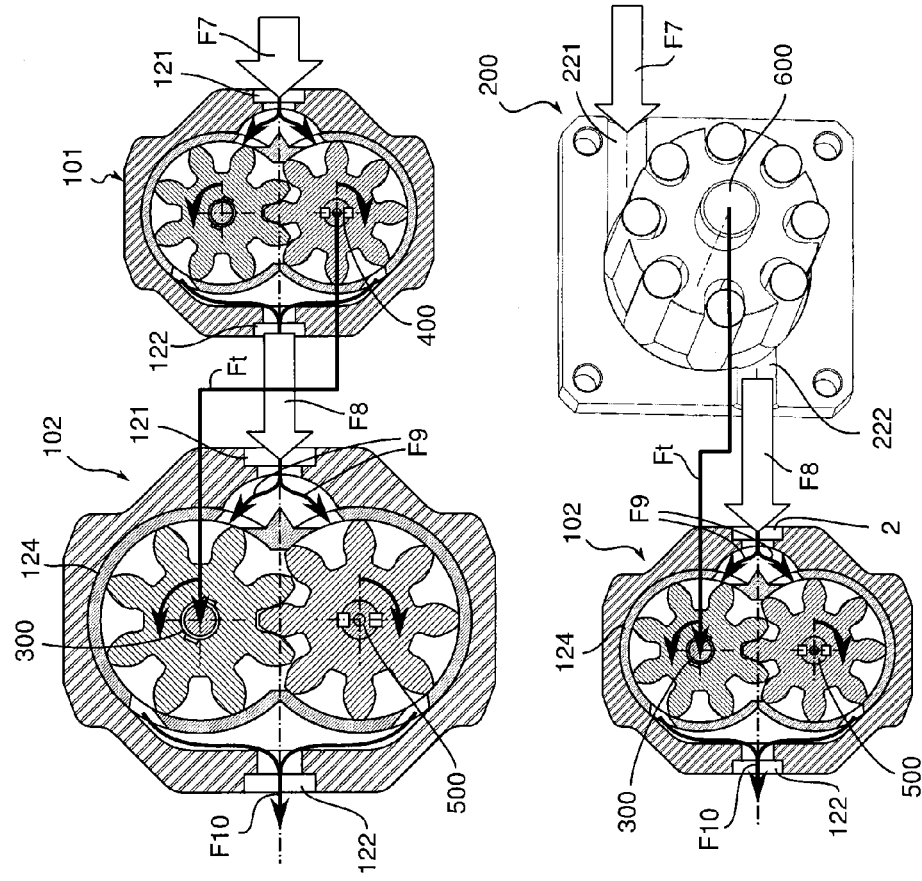
FIG. 7a is a sectional view of a two-stage positive displacement motor having two spur-pinion motors.
FIG. 7b is a sectional view of a two-stage positive displacement motor, having a roller motor coupled to a spur-pinion motor.

As a variant of the examples of single positive displacement motor described above, the motors 1 or 100, FIGS. 7a and 7b show in section a two-stage positive displacement motor, having respectively either two spur-pinion motors 101 and 102 (FIG. 7a), for example of the same type as the motor 100, or a roller motor or vane motor 200 (seen in section) and the spur-pinion motor 102 (FIG. 7b).

Figure 8A:
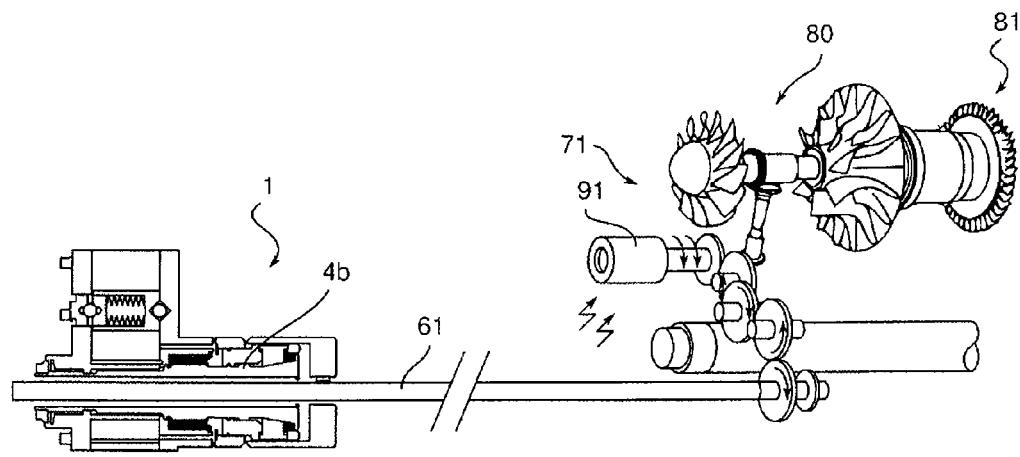
FIG. 8a is an example of mounting a positive displacement motor of a start-up system according to the invention on the shaft of an accessory gearbox of a turbine engine.
Figure 8B:
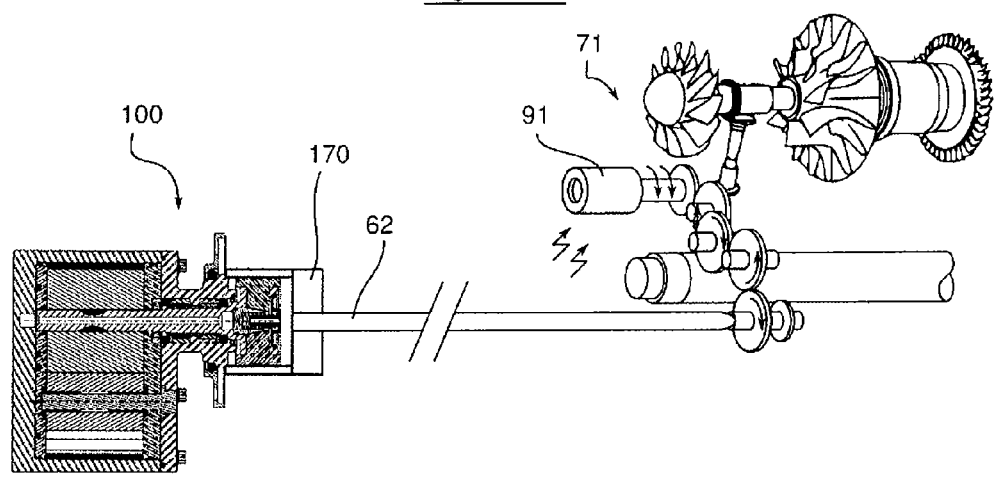
Figure 8C:
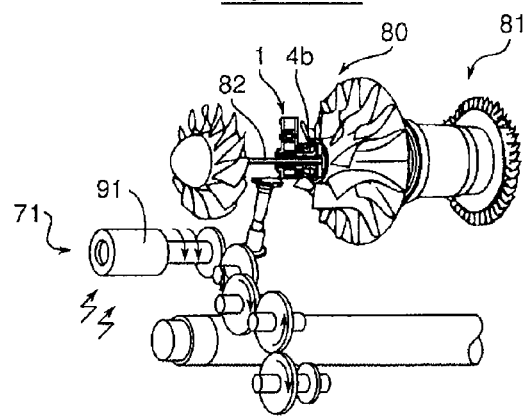

The gases released by a pyrotechnic generator are propelled to the inlet 121 or 221 of the first stage (arrows F7), constituted respectively by the spur-pinion motor 101 (FIG. 7a) or by the roller-type or vane-type motor 200 (FIG. 1b), coupled downstream to a second stage mounted in tandem, constituted by the spur-pinion motor 102. At the outlets 122 or 222 of the first stage, the gases are projected towards the inlet 121 (arrows F8) and into (arrows F9) the second motor 102 through the jackets 124. The second motor 102 is advantageously larger in size than the first motor 101 or 200 so as to avoid impeding the first motor. The drive shaft 400 or central shaft 600 of the first motor, 101 or 200 respectively, is mounted in the secondary shaft 300 of the second motor 102 (arrows Ft), while the drive shaft 500 of the second motor drives the set to be restarted. The gases leave via the outlet 122 of the second motor 102 (arrows F10).

Where the set to be started in an emergency is a turbine engine having an HP spool shaft, examples of mounting positive displacement motors 1 or 100 of the system according to the invention are illustrated in FIGS. 8a to 8c.

With reference to the perspective view in FIG. 8a, the driven shaft inserted into the drive shaft 4b of the positive displacement motor 1 is a shaft 61 of the accessory gearbox 71 mounted on the HP spool 80 of the turbine engine 81. The accessory gearbox 71 is fitted with an electric starter 91, which is a redundant back-up starter component.

With reference to the perspective view in FIG. 8b, the driven shaft 62 of the turbine engine 81 is mounted on a bell housing rigidly connected to a pinion of the accessory gearbox 71. The bell housing is the centrifugal clutch 170 of the positive displacement motor 100.

With reference to the perspective view in FIG. 8c, the driven shaft inserted into the drive shaft 4b of the positive displacement motor 1 is directly the HP shaft 82 of the HP spool 80 of the turbine engine 81.

The present invention is not limited to the examples described and illustrated.

It is, for example, possible to use helical-cut pinions, managing the sealing of the casing, or else "juxtaposed" pinions in the positive displacement motors.

As an alternative to friction coupling, other coupling means exist: overrunning clutch, electromagnetic mirror (using Foucault currents), viscous coupling of electrorheological or magnetorheological fluids.

In addition to pinion-type and vane-type motors, roller-type rotors can be used, coupled with guide slots in the axial plates.

For instance, in the case of a set such as an Ericsson or Stirling cycle heat engine or equivalent, having a heat exchanger and a variable angle setting circuit, the driven shaft is the control shaft of the heat exchanger assembly and the electronic unit incorporates an additional, adapted setting angle function during the isochoric phases of the heating and condensation cycle of the heat engine cycle.

Furthermore, the number of lobes or teeth of the pinions can obviously vary, for example from 2 to 8 lobes (as shown), or even more. The return means can be selected from at least one helical spring, at least one metal blade, an electromagnet and a piston-type gas cartridge. The triggering alarms include alarms for detecting potential fires by means of the heat-sensitive component, and the alarms controlled by the computer.

Furthermore, the electronic board can incorporate a temperature measurement component managed by the microcontroller to monitor high temperature values and allow the computer to determine service life without detracting from operational safety.

Advantageously, the pyrotechnic gas generators can be arranged as a battery, in housings mounted in a cylinder driven by an arming mechanism linked to the inlet conduit of the casing of the positive displacement motor.

The invention claimed is:

1. An emergency start-up method for an energy generator set by coupling one pyrotechnic gas combustion generator with a positive displacement motor automatic coupling to said energy generator set or uncoupling from said energy generator set comprising:
   if an emergency start-up situation for the energy generator set is detected, triggering at least one pyrotechnic gas combustion generator;
   generating pressurized gases by combustion and said pressurized gases being injected directly into a positive displacement motor with gear wheels, a portion of the pressurized gases rotating the gear wheels of the positive displacement motor and, simultaneously, a remaining portion of the pressurized gases projecting a first connection means driven in rotation by the positive displacement motor toward a second connection means driving in rotation the energy generator set, wherein the remaining portion is configured to exert an axial force on a conical coupling along a longitudinal axis of a gear shaft of the positive displacement motor, and the conical coupling exerts a radial force along a radial direction of the gear shaft in response to said axial force, thereby establishing a coupling connection between the positive displacement motor and the energy generator set, against a restoring force exerted by a return spring on the first connection means, the coupling connection bringing about transmission of energy by rotating the gear shaft of the positive displacement motor on a driven shaft of the energy generator set; and when thrust falls below the restoring force, the return spring exerts the restoring force that automatically repels said first connection means so that the coupling connection is broken and the energy generator set is disconnected uncoupled from the positive displacement motor.

2. The emergency start-up method according to claim 1, wherein the coupling connection between the gear shaft and the driven shaft of the energy generator set to be restarted is produced by friction.

3. The emergency start-up method according to claim 2, wherein the remaining portion of the pressurized gases is injected into the positive displacement motor centrally along the longitudinal axis so that the coupling connection uses the conical coupling to rotate the driven shaft of the energy generator set to be restarted.

4. The emergency start-up method according to claim 1, wherein the remaining portion of the pressurized gases is injected into the positive displacement motor peripherally about the longitudinal axis so that the coupling connection uses radial compression to rotate the driven shaft of the energy generator set to be restarted.

5. The emergency start-up method according to claim 1, wherein successive instances of pyrotechnic gas combustion generation are triggered.

6. An emergency start-up system for an energy generator set configured to implement an emergency start-up method for an energy generator set, comprising:

if an emergency start-up situation for the energy generator set is detected, triggering at least one pyrotechnic gas combustion generator;

generating pressurized gases by combustion and said pressurized gases being injected directly into a positive displacement motor with gear wheels, a portion of the pressurized gases rotating the gear wheels of the positive displacement motor and, simultaneously, a remaining portion of the pressurized gases projecting a first connection means driven in rotation by the positive displacement motor toward a second connection means driving in rotation the energy generator set, wherein the remaining portion is configured to exert an axial force on a conical coupling along a longitudinal axis of a gear shaft of the positive displacement motor, and the conical coupling exerts a radial force along a radial direction of the gear shaft in response to said axial force, thereby establishing a coupling connection between the positive displacement motor and the energy generator set, against a restoring force exerted by a return spring on the first connection means, the coupling connection bringing about transmission of energy by rotating the gear shaft of the positive displacement motor on a driven shaft of the energy generator set; and when thrust falls below the restoring force, the return spring exerts the restoring force that automatically repels said first connection means so that the coupling connection is broken and the energy generator set is uncoupled from the positive displacement motor, the emergency start-up system further comprising:

the at least one pyrotechnic gas generator, connected to an electrical initiator, the electrical initiator being connected to a computer;

the positive displacement motor comprising a casing defining an internal space housing gear wheels, or straight-cut, the pyrotechnic gas generator being coupled to the positive displacement motor by a gas inlet in the casing;

wherein the positive displacement motor includes the first connection means, configured to move at one end of a drive shaft centered about a gear-wheel axis of the positive displacement motor, configured to achieve the coupling connection between the drive shaft of the positive displacement motor and the driven shaft of the energy generator set via a centrifugal clutch; and wherein the return spring arranged in abutment is configured to exert the restoring force against pressure exerted on the coupling connection by the pressurized gases to break the coupling connection.

7. The emergency start-up system according to claim 6, wherein an annular space, formed in an extension of the casing on a periphery of the drive shaft of the positive displacement motor, communicates with the internal space to allow some of the pressurized gases coming from the combustion of the pyrotechnic gas to be injected as far as the first connection means, the first connection means including a piston, configured to be moved in translation by thrust of said some of the pressurized gases along the drive shaft of the positive displacement motor, to exert pressure on the second connection means configured as a ferrule configured to move aside radially under pressure and driving the centrifugal clutch by friction.

8. The emergency start-up system according to claim 7, wherein the ferrule includes at least an open annular portion, which is moved aside radially by sliding along a conical portion of the drive shaft of the positive displacement motor.

9. The emergency start-up system according to claim 7, wherein a conduit connected to the gas inlet of the casing communicates with a central bore of the drive shaft to allow some of the pressurized gases coming from the pyrotechnic gas generator to circulate as far as the connection means, the connection means including the piston configured as a conical piston, which is configured to be moved in translation by thrust of the some of the pressurized gases along an axis of the drive shaft of the positive displacement motor, to become housed in a tapered bore, rigidly connected to the centrifugal clutch, to drive the centrifugal clutch by friction.

10. The emergency start-up system according to claim 7, wherein the electrical initiator includes an electronic unit including an autonomous electrical power source, and an electronic control board incorporating a heat-sensitive component and a microcontroller for managing the electrical power source, the heat-sensitive component, functional self-tests and alarms for triggering an ignition cartridge of the pyrotechnic gas generator.

11. The emergency start-up system according to claim 7, wherein the gear wheels of the positive displacement motor are spur pinions.

12. The emergency start-up system according to claim 7, wherein the energy generator set is a turbine engine including a shaft of a high pressure spool, and the driven shaft is chosen from a shaft of an accessory gearbox mounted on the high pressure spool, a bell housing rigidly connected to a pinion of the accessory gearbox and used as a centrifugal clutch, or the shaft of the high pressure spool.

* * * * *